Feb. 20, 1940.  A. E. GLANCY  2,191,107
SIZE TESTING SYSTEM
Filed April 16, 1937  3 Sheets-Sheet 2
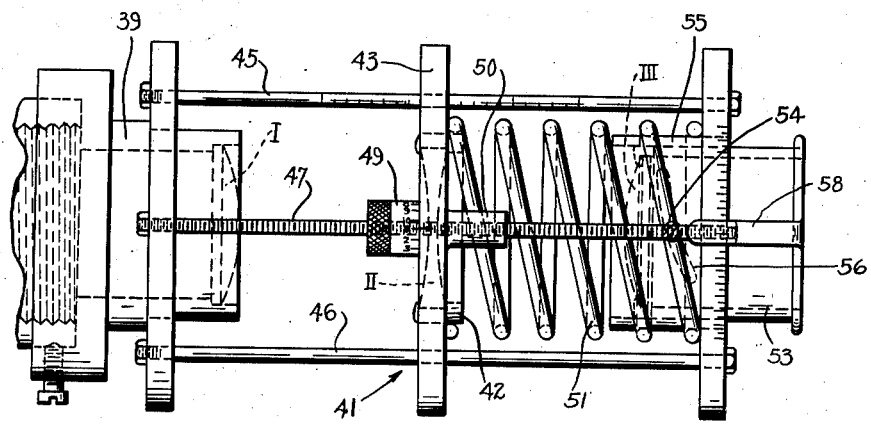
Fig. IV
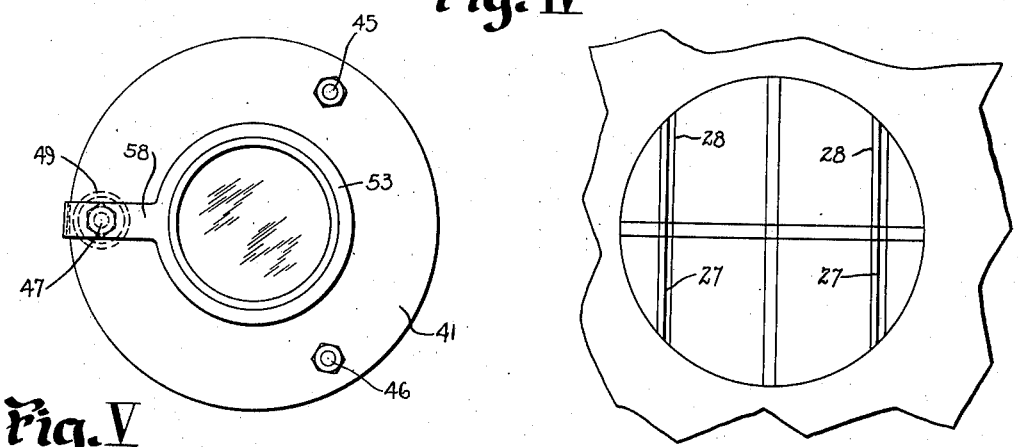
Fig. V
Fig. VII
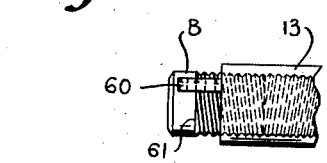
Fig. IX
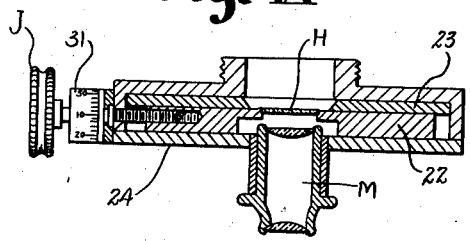
Fig. VIII
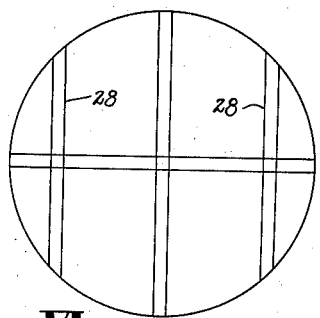
Fig. VI
INVENTOR
ANNA ESTELLE GLANCY
BY
Harry H. Stull.
ATTORNEY Feb. 20, 1940.    A. E. GLANCY    2,191,107
SIZE TESTING SYSTEM
Filed April 16, 1937    3 Sheets-Sheet 3
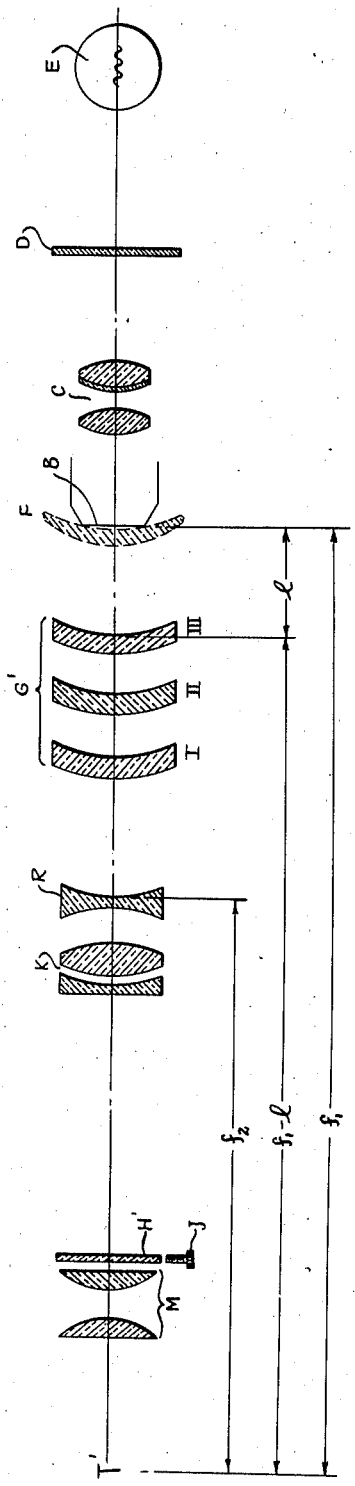
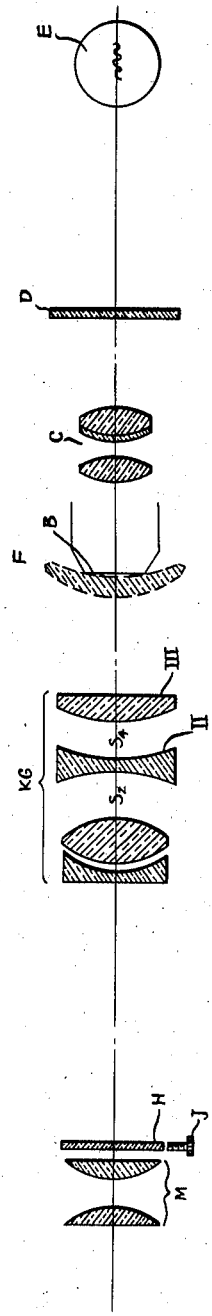
INVENTOR
ANNA ESTELLE GLANCY
BY Harry H. Styll
ATTORNEY Patented Feb. 20, 1940

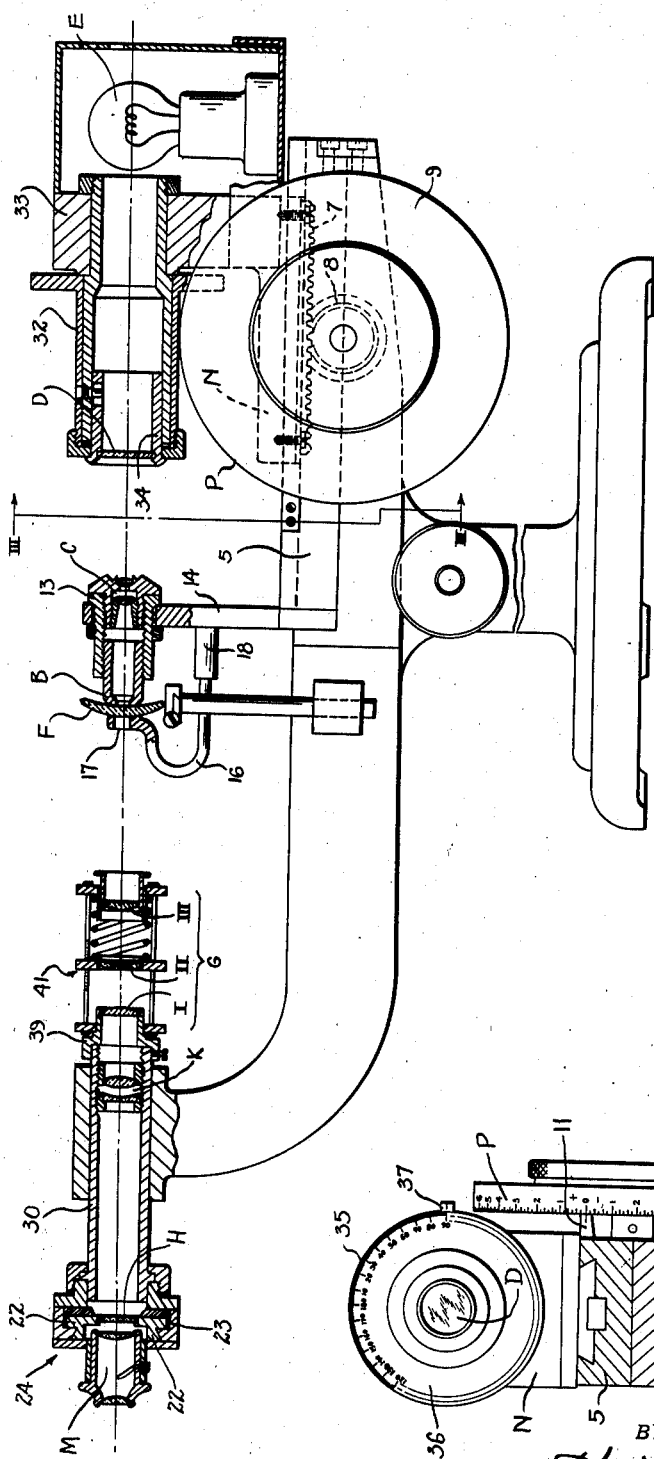
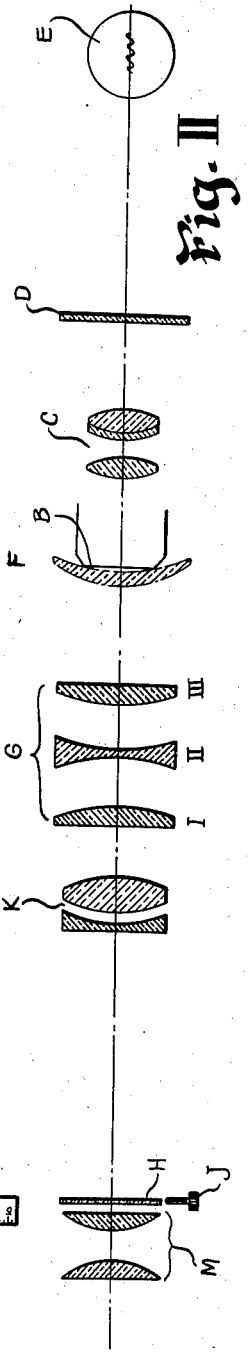

2,191,107

UNITED STATES PATENT OFFICE 2,191,107

SIZE TESTING SYSTEM

Anna Estelle Glancy, Southbridge, Mass., assignor to American Optical Company, Southbridge, Mass., a voluntary association of Massachusetts Application April 16, 1937, Serial No. 137,229

3 Claims. (Cl. 88—56)

The present invention relates to the measurement of the magnification produced by an optical system, and more particularly to improved method and means for varying the size of image obtained by a lens in a lens measuring device without change in the focal power of the system so as to accurately determine the magnification attributable to the lens.

The novel principles of my invention have decided advantages as applied to a lens measuring device of the type disclosed in Troppman Patent No. 1,083,309, patented January 6, 1914, and the invention will, for purposes of illustration, be described and shown as applied to such a lens measuring device. It will be understood, however, that my invention may be applied to other devices where it is found desirable to change the image size.

In the accompanying drawings which illustrate my invention:

Fig. I is a partial cross section of a lens measuring device in which the present invention has been incorporated;

Fig. II is a schematic diagram of the combination of optical systems found in the lens measuring device shown in Fig. I;

Fig. III is a sectional view taken on line III—III of Fig. I and looking in the direction indicated by the arrows;

Fig. IV is an enlarged view in side elevation of the optical system incorporated in the lens measuring device for determining magnification, this optical system being such that the separation of its elements can be varied to determine the magnification attributable to a lens being measured;

Fig. V is an end view of the mechanism shown in Fig. IV, this view being taken from the right end of Fig. IV;

Fig. VI is a partial detail view showing the image of the target appearing in the focal plane of the focusing system or objective lens system of the lens measuring device;

Fig. VII is a similar detail view showing this image as thrown upon the screen and viewed through the eye piece of the lens measuring device;

Fig. VIII is a horizontal sectional view through the eye piece and screen of the device, the plane of this section passing through the axis of the eye piece;

Fig. IX is a fragmentary view illustrating on an enlarged scale the adjustable nose of the lens measuring device;

Fig. X is a diagram similar to Fig. II of a modification of the arrangement of optical systems in which an element of one system is merged in an adjacent system; and Fig. XI is a diagram similar to Fig. II modified to take care of measurements of reciprocal magnification in corrective lenses for near vision.

Mechanism and a technique for determining the difference in the angular size of the ocular images of the two eyes of a patient are described in the application of Kenneth N. Ogle, Serial No. 713,701 filed March 2, 1934. The prescription lenses having been prepared, it becomes important to be able to exactly determine the magnification produced by these lenses.

Accordingly one object of my invention is to provide means for acurately measuring the magnification produced by a lens or lens system. A further object is to provide an attachment for a lens measuring device for determining the magnification attributable to the lens being measured.

Referring to the illustrative embodiment of my invention shown in Figs. I and II the lens measuring device includes a combination of optical systems whose members are indicated by letters. A projection lens system C transmits the light from a target D, and can be focused so as to pass the light as parallel rays through a lens rest B. The target D receives illumination from an electric light bulb E. If desired, a condensing lens or lens system may be interposed between the bulb E and the target D for obtaining better illumination of the latter. A lens F to be tested or measured is shown held in place on the nose or lens rest B.

The parallel light rays, after passing through the lens rest B, pass through the variable size system G to which the present invention more particularly pertains; and are then focused on the screen H provided with a screw J for centering the screen so as to accurately receive the image of the target D. The lens system for thus focusing the image on the screen H is indicated at K; and is designed so that parallel light is focused by this lens system K in the plane of the screen H. The screen H is viewed by the observer through the magnifying eyepiece M.

The operation of the instrument as described thus far is as follows: The target D is on a target carriage N whose movements are indicated by a scale P. When there is no lens on the rest B, the carriage N is at the zero reading provided the image of the target D is sharply focused on the screen H. If a lens or optical system F whose focal power is to be measured is placed on the rest B, the carriage N must be moved to change the distance from the target D to the lens system C in order to again bring the image of the target D into sharp focus on the screen H. The lens F on the lens rest B being at the principal focus of the lens system C, the scale P is a linear scale, i. e. if we consider $x$ to be the linear displacement of the target from its zero reading, which is at one of the principal foci of C, and $x'$ to be the distance of the image of the target from the other principal focus of C, and $f$ to be the EFL of C, then the relation holds true that $x.x'=f^2$; and when the lens or optical system F under test is placed on the rest B, the linear displacement $x$ of the target in order to bring the image of the target again into sharp focus on the screen H (due to causing the light leaving the last surface of F to be parallel light) is proportional to the effective power of F. In other words $x'$ then gives the back focus of F measured from the surface of F which is at a principal focus of C. The reading on the scale P therefore gives the focal power of the lens on the rest B.

In the embodiment shown, the carriage N slides along a table 5, and has a rack 7 secured to its under side which is engaged by a pinion 8 which may be manipulated through a dial 9 rotatable therewith. The outer periphery of the dial has suitable graduations F which, in cooperation with an indicator 11, indicate the power in diopters of the lens F being measured.

The projection lens system C is mounted in a tube 13 suitably secured in the upper end of an apertured bracket 14. The lens positioning nose or lens rest B is threadedly engagedly engaged in the forward end of the tube 13. This nose may be screwed in or out to adjust the position of the lens F so that the surface in engagement with the nose B will be exactly in the plane of the principal focus of the lens system C. When a lens or lens system F to be tested is placed on the nose B, the dial 9 may be adjusted until a clear cut image of the target D is seen in the plane of the screen H. The reading of the dial, of course, indicates the focal power of the lens or lens system.

Suitable means such as a gooseneck bracket 16 having an aperture 17 through which the rays of the image may pass is operable to bear in one position against the outer side of the lens F being tested or to swing to inoperative position for releasing the lens F. The lower end of the bracket 16 is slidable in a tubular guide 18, and is biased by means of a spring (not shown) so as to press the lens F against the nose B.

The screen H is carried by a dovetailed slide 22 which is slidably mounted in a dovetailed groove 23 in a box-like support 24. This support is rotatably mounted adjacent the eyepiece M, the lens system of the latter being mounted for sliding adjustment relative to the support 24 so as to permit adjustment for the focal requirement of each individual operator. The slide 22 is moved in the groove 23 by means of an adjusting screw J.

The screen H carried by the slide 22 is shown herein in the form of a plate or transparent member having opaque reference lines 27 thereon (see Fig. VII). The target D is provided with a pair of bright reference lines 28 which register with the lines 27 if there is no lens F on the lens support B.

The image viewing portion of the instrument also comprises a tube 30 in which is mounted the focusing lens system K. This system K is composed of two or more lens elements which are so mounted as to be adjustable for bringing the image of the target D upon the screen H to such a size as to accurately superimpose the reference lines 27 upon the lines 28. Such adjustment is made when the instrument is assembled and remains fixed thereafter. A disclosure of suitable structure for this purpose is found in the Troppman Patent No. 1,281,717 and in the Tillyer Patents Nos. 1,542,112 and 1,556,550.

The target D is mounted for rotational movement about its axis through means of a tube 32 rotatably mounted in the apertured bracket 33 carried on the carriage N. The tube 32 has a telescoping tube 34 in which the target D is mounted, the tube 34 being adjustable to permit the alignment of the target D with the scale 35 at the time of assembly of the instrument. The scale 35 is on a dial 36, and cooperates with a marker 37 on the bracket 33. The target D can be rotated to orient the lines 28, and the marker 37 indicates on the scale 35 the angular position of the lines 28. Thus the operator has the selection of rotating either the box-like support 24 or the tube 32 to bring the lines 27 and 28 into alignment; and he may change the angular position of one for some purpose and rotate the other into conformity therewith.

The apparatus, as thus far described, functions to focus a sharp image of the target D on the screen H. If there is no lens F on the rest B, the lines 27 and 28 accurately register, as in Fig. VII, provided the original adjustment of the instrument was correct. If a lens or lens system F is placed on the rest B for measurement, the dial 9 is rotated to again bring the image of the target D on the screen H to a sharp focus, but now the lines 27 do not register accurately with the lines 28 due generally to what is described below as shape magnification. However, if the lens or lens system F has some prism, the screw J is rotated to shift the screen H to compensate for the shifting of the image due to this prism; and the screw J may be provided with graduations 31 for indicating the amount of prism in the lens or lens system F.

The change in the size of image introduced by the lens or lens system F is measured by compensating this change in size by the variable size system G which is interposed between the lens F on the rest B and the focusing lens systems K. The system G is adjusted to vary the size of image until the lines 28 again exactly register with the lines 27 on the screen H. The separation between the middle lens and an end lens of the system, gives the readings; and as mentioned below the relation is linear, so that variation in size is measured by a scale of substantially equal intervals. The variable size system and the principles of the relative movements of its elements will now be described.

As explained in my copending application Serial No. 131,352, filed March 17, 1937, three lens elements I, II and III can be adjusted in relative position so as to obtain a desired change in magnification; and if this is done by properly varying the separation of the three lens elements, this change in magnification can be accomplished without appreciable change in focal power, i. e., without change in the sharpness of image of the target D on the screen H.

In the application of E. D. Tillyer, Serial No. 720,594, filed April 14, 1934, is given an expression for the angular magnification of a distant object by a lens or lens system $M'=S'\ P'$ where $S'$ is a factor known as shape magnification depending on all the surface powers except the last refractive surface (the one nearest the stop point), and upon the optical thicknesses and separations, but independent of the total power of the system, and P' is a factor known as power magnification depending on the total power of the system and the position of the stop.

It will be noted that in the lens measuring device disclosed in the present application, the focal power of the lens or lens system F has no effect on the size of image produced on the screen H. In other words, the change in the position of the target D relative to the projection lens system C eliminates the effect of the focal power of F as concerns the size of image seen through the eyepiece M. This means that when the lens supporting edge of rest B is exactly in the focal plane of projection system C, an infinitely thin power lens placed against this edge with the target D adjusted for a sharp focus on screen H would not change the apparent dimensions of the target as seen through the eyepiece M. This infinitely thin lens would have no shape magnification; but when a lens having substantial thickness is placed against this edge and the focal power is compensated for by focusing the target D, the apparent dimensions of the target will be changed to the extent of the shape magnification S'. This gives the shape magnification S' independently of the power magnification P' of the lens F. The relation $M'=S' \cdot P'$, or rather $$\frac{1}{M'}=\frac{1}{S'}\cdot\frac{1}{P'}$$

is the basis of my equations, and I find it more convenient to introduce the following notation: Let $$M_p=\frac{1}{M'},\quad S_p=\frac{1}{S'},\quad P_p=\frac{1}{P'}$$

Then $M_p = S_p \cdot P_p$.

The required movements of the lens elements I, II and III which will give rigorously the desired changes in magnification without change in focal power are determined by the following equations:

$$-(1-s_3D_4)^2\Delta s_4 = \frac{\Delta s_2\left[1+\dfrac{D_{II}}{AD_{III}}\right]^2}{1-\Delta s_2\left[1+\dfrac{D_{II}}{AD_{III}}\right]D_{II}} \quad (1)$$

and $$\frac{\Delta M_p}{M_p}=\frac{\Delta S_p}{S_p}=-\frac{D_{II}}{D_{II+III}}AD_{III}(1-s_3D_4)^2\Delta s_4 \quad (2)$$

where $D_1, D_2, D_3, D_4, D_5$ and $D_6$ are the surface powers of the three lens elements in the order beginning with the surface nearest the objective system K;

$s_1, s_2, s_3, s_4,$ and $s_5$ are the optical thicknesses and separations;

$D_{II+III}$ is the "effective" power of the partial system II+III.

$AD_{III}$ is the "additive" power of lens III with respect to lens II, i. e., the power of lens III which is additive to lens II in the sense used in an additive trial set;

$M_p$ is the reciprocal of the factor which we are here determining; and $\Delta M_p$ is a finite change in $M_p$.

Equation 1 is the condition for a constant back focal length, or in other words, for constant focal power. Equation 2 gives the scale value for change in $M_p$ for a given motion of lens elements II and III; and as $M_p$ changes in direct proportion to the change in separation between lenses II and III, the scale on which reciprocal magnification is read is linear. In this discussion it has been assumed that the lens element I is fixed and that the lens elements which are moved are lens elements II and III. But as both the entering and the emergent rays are parallel, lens element III can be fixed while lens elements I and I are moved.

Moreover, as pointed out in my copending application above identified, the focal error caused by maintaining both outer lens elements, namely I and III, stationary is insignificant in a system which is well designed for this purpose. The best arrangement of which I am aware is one in which the middle lens element II is negative, the two outer lens elements being positive and of substantially equal power. For measurements of reciprocal magnifications up to ±5% the following system gives good results. It will be assumed that the index of refraction of the glass is 1.5232. The lenses I and III have their outer surfaces plane, the opposite surface of each being convex. The radius of curvature of this convex surface is 216.08 mm. corresponding to a power 2.4214 diopters. The center of each lens is 1.6 mm. thick. The middle lens is provided with opposed concave surfaces, the radius of each being 209.80 mm. corresponding to a power of −2.4938 diopters. The center of this lens is 3.046 mm. thick. The power of the system is zero.

If one of the outer lenses is fixed and the other is given compensating movement as required by the Equations 1 and 2 given above, the scale is divided into intervals 2 mm. in length, each interval representing 1% magnification.

If both outer lenses are maintained stationary, the scale indicating the reciprocal magnification is changed to compensate the error thus introduced; so that on the minus side of the scale each 2 mm. interval is equivalent to −0.975% instead of 1%, while on the plus side each 2 mm. interval is equivalent to +1.025%.

I will now give a specific example which is usable for reciprocal magnifications up to ±10%. Again it is assumed that the index of refraction is 1.5232. The outer surface of each of the outer lenses is plane and the other surface of each is convex. The radius of the latter surface of lens I is 219.83 mm. or a power of 2.380 diopters, and the radius of this surface of lens III is 220.30 mm. of a power of 2.375 diopters; and the thickness of both lens I and lens III at the center is 1.904 mm. The radius of each of the surfaces of the negative middle lens is 209.08 mm. or a power of −2.5024 diopters, the center being 1.523 mm. thick. The power of this system is zero.

Assume that either lens I or lens III is fixed. The middle lens II is moved along a scale in which each interval is 2 mm. long and represents 1% magnification, the movement taking place in either direction from the approximately central position at which magnification is unity. As before, if lens II is moved to the right (toward lens III) along the scale, there is a decrease in size of image; and if moved to the left (toward lens I) there is an increase in size of image. At the zero setting, in which the adjacent surfaces of lens I and II are separated by 20.80 mm. and the adjacent surfaces of lenses I and III by 21.00 mm., the separation of the two plane (outer) surfaces of lenses I and III is 47.14 mm. If the middle lens II is moved to the right to the +10% position, the separation of these two plane (outer) surfaces changes to 45.43 mm., while the separations between the adjacent surfaces of I and II, and II and III become 39.09 mm. and 1.00 mm. respectively.

Although the movement of the outer lens is here somewhat greater than in the first example, it is not so large as to be significant or even essential for fairly accurate results. Moreover, quite accurate results are obtained with both outer lenses stationary by compensating changes in the two portions of the scale extending from the unit position. On the minus side of the scale, each 1% change in reciprocal magnification would correspond to 2.0140 mm. or in other words, 2 mm. would correspond to 0.993% reciprocal magnification. On the plus side of the scale, each 1% change in reciprocal magnification would correspond to 1.912 mm. or in other words 2 mm. would correspond to 1.046% reciprocal magnification.

In these examples the middle lens II is negative and the outer lenses positive; however, it will be understood that the middle lens II may be positive and the outer lenses negative, the symmetrical arrangement of the outer lenses being preferably retained. This symmetrical arrangement in which the outer lenses are of substantially the same power is conducive of minimum error due to maintaining both outer lenses stationary and moving only the middle lens. The power of the middle lens determines the size of interval on the scale corresponding to a change of 1% in reciprocal magnification.

The mathematical basis for the above is given in my copending application above identified.

From the above it will be noted that the scale on which reciprocal magnification is read is linear. It is also true that the equation representing the required movement of the lens element III is of the second degree, and its curve is a symmetrical parabola with a maximum at the zero position of the middle lens, i. e., with magnification unity.

In my copending application, above identified, I have illustrated and described a device for bringing about the requisite correlated movements of lenses II and III. For measurements of reciprocal magnification which must be rigorously exact, a device which will bring about these movements of the middle lens element and one of the end lens elements must be employed. For the purpose of measuring ophthalmic lenses prescribed for the correction of abnormal conditions as to size and shape of the ocular images of the two eyes, known as "aniseikonia", it is possible to use a well designed system of lenses of which only the middle lens is moved. Mechanism for moving the middle lens of such a system is illustrated more particularly in Figs. I, IV and V of the present application.

A lens cell 39 is secured on the end of the tube 39 nearest the lens rest B. By means of this cell the lens element I is carried in fixed relation to the focusing system K. The remaining two elements of the system G are carried by a frame 41 mounted on the cell 39. A cell 42 carrying the middle lens II has an outer annular portion 43 perforated to receive the three posts 45, 46 and 47 of the frame 41. The post 47 is threaded to cooperate with a micrometer nut 49 on the peripheral portion 43. The graduations are marked on the post 45: these graduations correspond to the pitch of the screw thread on the post 47 so that one complete rotation of the nut 49 advances the lens cell 42 and its peripheral portion 43 exactly one graduation on the post 45.

The nut 49 is marked with graduations cooperating with a marker on the portion 43 so as to indicate tenths of turns of the nut 49. The outer portion of the nut 49 may be knurled for convenience in turning the nut. In order to insure alignment of the axis of the lens elements II during its travel, a sleeve portion 50 extends from the peripheral portion 43 along the post 47 to provide an elongate bearing for the latter. A coil spring 51 is interposed between the peripheral portion 43 and the end of the frame 41 opposite the nut 49 so as to take up slack and give more accurate readings of the micrometer nut.

Lens element III is mounted in a lens cell 53 adjustably supported in the end of the frame 41 opposite the cell 39. A pin 54 fixed to a sleeve 55 extends into a cam slot 56 in the cell 53, whereby slight adjustment of the position of lens elements III relative to lens element I may be effected. The sleeve 55 is fixed on the end of the frame 41. An indicator 58 extends outwardly from the cell 53, and its outer end is then bent into overlying relation with the end of the frame 41. This end is graduated to indicate the amount of adjustment of the cell 53.

The mechanism illustrated in Figs. IV and V is such that the optical system G is detachable from the lens measuring device. It is desirable in some cases that this lens system G be an attachment which is put in position when required and removed when not used. In other cases it is desirable that the lens system G be a permanent part of the lens measuring device; and as it is not necessary then to carry the lens element I in a separate lens cell 39, it is advantageous to incorporate the lens element I in the objective lens system K. Accordingly, this lens element loses its separate identity, and the lens system K is so calculated as to have both its own function and the function of lens element I of system G.

A modification of the combination of optical systems by which this merging is carried out is illustrated in Fig. X. Here the objective lens system K is made somewhat more powerful than in the combination of Fig. II, since the light entering K is divergent instead of parallel. In computing for correction of spherical aberration of the system K, account will of course be taken of the power added when lens element I is merged in system K. The separation $s_2$ is here measured between the adjacent faces of K and lens element II.

The arrangement of lens elements shown in Fig. II can also be modified to measure reciprocal magnification of near vision lenses. This modification is shown in Fig. XI. A negative lens R has been added to the objective lens system K, the power of this negative lens being determined as indicated below. It will be noted that because of this negative lens, the zero setting of the target D has been shifted. Furthermore, the light entering the auxiliary lens R is convergent. The lens R serves to render this convergent light parallel before entering the objective lens system K. The power of the minus lens R required to do this and its location relative to the lens rest B are determined by the condition that its virtual focal plane is at such distance from the lens rest B as has been assumed as standard reading distance, in general about 400 mm. The image of the target, as seen in the eyepiece M, is larger than the image seen in a lens measuring device when arranged according to the diagram shown in Fig. II; and accordingly the screen H' used in the arrangement shown in Fig. XI must be thus modified in size. This image of the target is the normal size for near vision measurements of magnification when the object distance is assumed to be at a distance $f_1$ from the ocular surface of a spectacle lens or lens system. If the "near vision" zero setting of the lens measuring device is $-2.50$ on the scale P, the "near vision" object distance measured from the ocular surface of a spectacle lens (or from a point 13.75 mm. from the cornea) is 400 mm. This is arbitrary.

Between the auxiliary lens R and the lens rest B is inserted a three lens system G' designed for near vision according to the principle set forth in my copending application above identified. As taught in that application, a near vision system is designed for a specific object distance $u_1$, measured from the object to the lens element III. Here the object distance $u_1$ is the distance $(f_1-l)$ from the image T' to the lens element III. Accordingly the required near vision system can be designed for this specific object distance and located with the fixed lens III in such position that the vergency of the light for near vision measurements and the design of the near vision system are consistent. Since the near vision three lens system is terrascopic, the vergency of the light is not altered by passage through the system.

The required movements of the lens elements I and II which will give the desired changes in magnification without change in focal power are here determined by the following equation:

$$\Delta \frac{1}{M} = u_1 (1 - s_5 [\overline{D_6}]) \frac{1}{EFL_\mathrm{I}} \cdot \frac{1}{EFL_\mathrm{II}} \cdot \Delta s_2 \quad (3)$$

in which $$\overline{D_6} = D_6 - \frac{1}{u_1}$$

i. e., the same image position results whether an object at finite distance $u_1$, is refracted at the surface $D_6$, or an infinitely distant object is assumed to be refracted at a fictitious surface $$\overline{D_6}$$

and $$\frac{1}{EFL_\mathrm{I}}, \frac{1}{EFL_\mathrm{II}}$$

are the "equivalent" powers of lenses I and II, respectively.

By definition, equivalent power is the reciprocal of the focal length referred to the principal planes of a lens or a system of lenses. This matter is fully disclosed in my copending application Serial No. 131,352, filed March 17, 1937.

It is not always necessary, however, to obtain such rigorously exact measurements. A workable system is provided if lens II is kept fixed. In such a modified arrangement, the system departs from the terrascopic condition slightly, and this error can be compensated by appropriate adjustment in the scale value by which reciprocal magnification is indicated. The correction in the sale reading is equal to a factor times the terrascopic magnification and this factor is $$-\frac{0.1}{h} \Delta s_2$$

where $h$ theoretically is the distance from the stop or window to the object, and actually is approximately the distance marked $f_1$ in Fig. XI.

The arrangement of optical systems, illustrated in Fig. XI, are operated as follows: The target D of the lens measuring device is moved to the proper setting on the scale P to give a sharp image of this target on the scale H'. It is immaterial whether the optical system G' is in position or not at the time when the image of the target is focused in the eyepiece, since the system G' is terrascopic. The zero readings of system G' gives unit magnification. The near vision lens F to be measured is positioned on the lens rest B with its ocular surface against the lens rest. The target D is shifted until the image is again seen sharply in the eyepiece M. If there is magnification, the lines 27 and 28 do not accurately register. While the image remains sharply in focus, the lines 27 and 28 may be brought into registry by shifting lens I (or both lens I and lens II for rigorously accurate determinations). When by such operation of the optical system G' the lines 27 and 28 have been brought into accurate registry, the per cent magnification is read from the reciprocal magnification scale.

It is desirable in the case of certain spectacle or other lenses to know what effect displacement from the normal position of the lens will have. For example, if the trial lens was placed at a given distance from the cornea of the eye of the patient, and it is desired to prescribe a spectacle lens to be worn at a different distance, a correction must be incorporated in the power of lens prescribed. A lens measuring device equipped with a movable lens rest, such as illustrated in Figs. I and IX of the present application, affords a means of measuring directly whether the lens or lens system will have the same effect on the eye as the original trial lens, when worn at the prescribed distance from the cornea. Also, such a movable lens rest can be set for the prescribed change of position to determine the amount by which the prescription should be changed. As illustrated in Fig. IX, the lens rest B is movable in and out from its zero setting, that is, the position wherein its lens supporting edge lies in the plane of the principal focus of the projection lens system C. To determine this zero position and to determine the amount of in and out movement of the lens rest B, suitable scale and indicator means 60 and 61 are used. The lens rest B is threaded into the tube 13 according to the embodiment shown. It will be understood that the lens rest B may be otherwise adjustably mounted in the tube 13 so that it may be adjusted in and out and held in adjusted position.

Displacement of the lens from the normal position has the further effect of changing the magnification of image. My size measuring system G or G' is useful, therefore, in connection with an adustable lens rest of the type illustrated in Fig. IX, for measuring the magnification produced by a lens when worn in the prescribed position, for instance, at a different distance from the cornea than that at which the trial lens was placed. Moreover, it sometimes happens in the designing of lenses for correction of the difference in the angular size of the ocular images of the two eyes that the two lenses are designed to be worn at different distances from the cornea. By employing a size measuring system G or G' (as the case may be) in cooperation with an adjustable lens rest B, it is possible to verify the lenses furnished to the patient.

The teaching of the present application relates primarily to improvements in the determination of magnification produced by a lens or lens system. One of the principal advantages of my invention is that such determination requires of the observer merely that he accurately determine whether two superimposed lines are in registry. He does not read a scale along side the image so as to determine the relative magnitude of the image. Instead, the observer adjusts the lens measuring instrument so that the superimposed lines are accurately in registry and then reads from the micrometer nut how much adjustment he has made to bring the lines into registry. It will be apparent, therefore, that there is an important advantage in my invention in that the observer scrutinizes the image of the target merely for the purpose of determining whether it accurately registers with the reference lines or not. This contributes toward more accurate observations, particularly with a somewhat less experienced observer.

In explaining my invention I have given certain specific examples by the way of specific application of the principles of my invention. Variations in the applications of these principles are of course possible. The magnification need not stop at 5%, or 10%, if larger magnifications are desired. Moreover, although I have given examples which start from a zero position, it will be obvious that instead of starting from zero it is quite as feasible to design a system for which the magnification at the zero position is different from unit. It will be understood, therefore, that my invention is not limited to the specific examples given but may be otherwise embodied and practiced within the scope of the following claims.

I claim:

1. A device for measuring the shape magnification of a lens system comprising a test target, a projection lens system normally so located relative to said test target and having such optical characteristics as to produce a projected test image of said test target by parallel light emanating from said system, means for supporting a lens system to be tested at a test position located substantially at a principal focal point of said projection lens system whereby the parallel rays emanating from said projection lens system will traverse said test position, means for moving said test target toward and away from the projection lens system an amount sufficient to compensate for deviations of the light rays from parallelism as effected by the focal power of a lens system under test and located at said test position so that said rays will emanate from said lens system under test in substantially parallel relation simulating the parallelism of said rays as normally traversing said test position, means for receiving the image projected by said rays having size scale indications of a zero size image associated therewith and means including a lens system for shifting the width of parallelism of the rays to increase or decrease the size of image which is projected by said parallel rays after traversing the lens system under test, with substantially no introduction of focal power, until the size of image simulates the width of the zero size image scale indications and means graduated in terms of percent magnification and associated with said lens system for altering the size of the image for indicating the extent of adjustment necessary to produce an image of the size of the zero size image of the scale indications.

2. A device for measuring the shape magnification of a lens system for use with an instrument having a test target, a projection lens system normally located relative to said test target and having such optical characteristics as to produce a projected test image of said test target by parallel rays emanating from said system, means for supporting a lens system to be tested at a test position located substantially at a principal focal point of said projection lens system whereby the parallel rays emanating from said projection lens system will traverse said test position, means for moving said test target toward and away from the projection lens system an amount sufficient to compensate for deviations of the light rays from parallelism as effected by the focal power of a lens system under test and located at said test position so that said rays will emanate from said lens system under test in substantially parallel relation simulating the parallelism of said rays as normally traversing said test position, said device for measuring the shape magnification comprising a lens system of three lens elements whose optical characteristics may be varied for increasing or decreasing the width of parallelism of the rays to increase or decrease the size of image which is projected by said parallel rays after traversing the lens system under test, with substantially no introduction of focal power, to vary the size of image to render it substantially equal to a predetermined zero size of image and graduated means associated with the lens system of said device for indicating the extent of adjustment necessary to produce an image of the size of the predetermined zero size image, and means associated with said instrument on which the image may be focused for sizing.

3. A device for measuring the shape magnification of a lens system comprising a test object, a projection lens system, means for positioning the lens system to be tested at one of the principal focal points of said projection lens system, means for viewing said image, a focusing lens system for bringing the image of said test object projected by said lens system to a focus on said means for viewing said image, means for adjusting said test object relative to said projection lens system, scale means cooperating with said test object and having its zero point at the conjugate focal point of said projection lens system so that light rays emanating from said projection lens system will normally be substantially parallel when the test object is at said zero point, said test object being adjustable toward and away from the projection lens system to compensate for deviations of the light rays from parallelism as effected by the focal power of a lens system under test located at said first named principal focal point of said projection lens system and a calibrated optical system, disposed between the focusing lens system and the lens system to be tested when in said test position in said instrument, and capable of adjustment to optically vary the dimensions of the projected image without appreciably varying the plane of said image.

ANNA ESTELLE GLANCY.